United States Patent [19]
Snelling et al.

[11] 3,816,043
[45] June 11, 1974

[54] APPARATUS FOR MAKING HOLLOW TUBING HAVING AN ANNULAR WALL OF FOAMED MATERIAL

[75] Inventors: Charles D. Snelling, Allentown; Theodore E. Andrews, Kutztown; John J. Weller, Emmaus, all of Pa.

[73] Assignee: Armstrong Cork Company, Lancaster, Pa.

[22] Filed: Jan. 22, 1973

[21] Appl. No.: 325,509

Related U.S. Application Data

[62] Division of Ser. No. 69,661, Sept. 4, 1970, Pat. No. 3,754,064.

[52] U.S. Cl............... 425/4 C, 264/47, 425/112, 425/135, 425/381, 425/817 C
[51] Int. Cl............................................. B29d 27/00
[58] Field of Search........ 425/4 C, 135, 381, 817 C; 164/85, 154; 226/23

[56] References Cited
UNITED STATES PATENTS

| | | | |
|---|---|---|---|
| 3,215,581 | 11/1965 | Carlson et al.................. | 425/4 C X |
| 3,368,665 | 2/1968 | Jinkins............................. | 226/23 X |
| 3,429,956 | 2/1969 | Porter............................. | 425/4 C X |
| 3,432,582 | 3/1969 | Bender........................... | 425/4 C X |
| 3,661,196 | 5/1972 | Kummant........................ | 164/85 |

Primary Examiner—R. Spencer Annear
Assistant Examiner—Mark Rosenbaum
Attorney, Agent, or Firm—Sandoe, Hopgood & Calimafde

[57] ABSTRACT

An apparatus and method are provided for continuously forming hollow tubing of foam material comprising a mandrel fixed at one end about which said tubing is formed from a web of material by confining the foam material within an annular space of an envelope of flexible laminar material which is allowed to foam and expand and the envelope of confined foamed material then moved longitudinally of said mandrel and thereafter cured while moving along said mandrel. In order to assure cross-sectional symmetry or concentricity of the hollow tubing, means are provided for aligning the mandrel by controlling its flexure to a position which will provide a product having the desired concentricity, and means associated with a region of the mandrel away from the fixed end for detecting variations in alignment from the desired alignment, whereby when a variation in alignment is detected, the means for aligning the mandrel is actuated to compensate for the detected variation.

13 Claims, 17 Drawing Figures

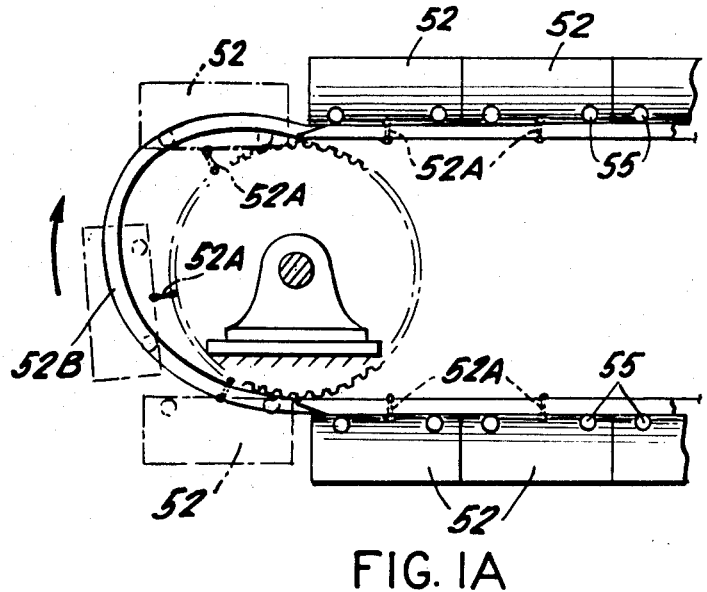
FIG. IA
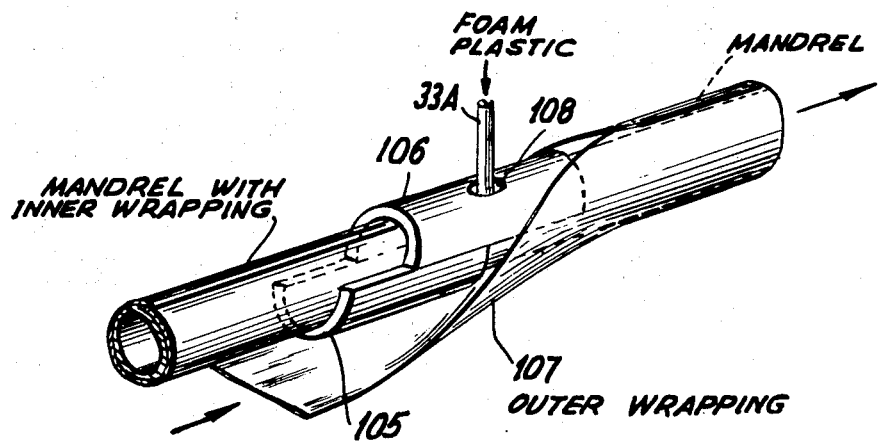
FIG. IB

APPARATUS FOR MAKING HOLLOW TUBING HAVING AN ANNULAR WALL OF FOAMED MATERIAL

This is a division of copending application Ser. No. 69,661, filed Sept. 4, 1970 now U.S. Pat. No. 3,754,064.

This invention relates to a method and apparatus for making hollow tubing of foam plastic having insulating properties and is an improvement over the invention described and claimed in U.S. Pat. No. 3,118,800 which issued to Charles D. Snelling on Jan. 21, 1964.

The term "tubing" employed herein is intended to cover such hollow longitudinal products as pipes, ducts, insulating covering for pipes and the like having inner and outer peripheral surfaces of either cylindrical or prismatic configuration.

FIELD OF THE INVENTION

It has been known to produce elastomeric cellular structures having excellent heat-insulative and shock-absorbing properties. Of interest are cellular products of foam plastic or elastomeric materials, such as expanded polystyrene, and the like, or polyurethane material formed from liquid polymeric reaction mixtures containing polyisocyanates. The reaction mixtures are polymeric materials which are either liquid at room temperature or capable of being melted at relatively low temperatures. The polymeric materials contain active hydrogen atoms which react with the isocyanate groups to form a network of cross-linked molecular chains. The polyisocyanate not only functions as a cross-linker or curative for the polymeric material but also reacts with water provided in the liquid reaction mixture to form carbon dioxide which causes the liquid reaction mixture to expand and foam, whereby a cellular structure is formed which retains its foamed cellular character after the polymer has been cross-linked or cured.

The reaction between the isocyanate and the water to form carbon dioxide and the reaction between the polyisocyanate and the polymeric material to effect a cure of the polymeric material takes place concurrently. The composition of the mixture is generally controlled so that, after the desired expansion of volume has been effected, curing obtains.

The foregoing materials have given rise to the production of foamed-in-place plastic shapes for use in electrical, shipping, aircraft and other industries where low density, high dielectric strength, high heat insulation, good shock absorbing and other properties are desired.

In producing foamed-in-place shapes, it has been necessary to employ rigid retaining means in order to obtain the desired surface configuration. For example, in producing conduits with the annular wall formed of foamed plastic, in order to make sure that the wall had the correct shape and that the inner and outer surface of the conduit would be substantially equally spaced from each other or substantially concentric, it was necessary to employ rigid retaining means or molding surface for both the inner and outer surface of the conduit. This method had its limitations in that it was difficult to produce long lengths of the conduit economically.

In U.S. Pat. No. 3,118,800, the disclosure of which is incorporated herein by reference, a method and apparatus are proposed for overcoming the foregoing limitations in the production of long lengths of hollow tubing, such as conduits, pipes, ducts, and the like, having an annular wall of expanded porous plastic. In its essentials, the patented method comprised providing a smooth mandrel whose surface corresponds peripherally to the inner surface of the hollow cylindrical or prismatic product, such as a conduit, pipe, duct or tube, forming about the mandrel a tubular covering in sliding engagement therewith constituting the inner surface of the product, surrounding the inner surface with an envelope of flexible sheet material whose width or circumferential length corresponds substantially to the circumference of the outer surface of the product, adding a foaming plastic mixture to the space formed between the tubular covering and the surrounding envelope in an amount sufficient to fill the space after the mixture has foamed, carrying out the foaming of the mixture against the tubular covering supported by the mandrel and against the envelope of flexible material whereby to fill the space, polymerizing the mixture to form a hollow product having an annular wall of polymerized porous plastic tightly covered with said envelope material, and removing said product from the mandrel.

The apparatus proposed for carrying out the aforementioned method includes mandrel means forming a supporting surface corresponding to the inner surface of the product, the mandrel being fixed at one end in substantially a horizontal position, means for forming a flexible sheet material into a tubular covering about said cylindrical supporting surface, means for forming a flexible sheet material into an envelope spaced from but completely surrounding the supported tubular covering and providing an annular space therebetween, means for inserting a polymerizable, expansible plastic mixture into the annular space between the tubular covering and the surrounding envelope and means for supporting the envelope including the plastic mixture within the annular space until the plastic mixture has expanded, completely filling the space and polymerized.

While the foregoing method and apparatus were a big step forward in producing long lengths of hollow annular products of foam plastic, particular care had to be taken during the continuous production cycle to assure that the product moved along and off the mandrel and had the desired wall concentricity or symmetry. For example, since the mandrel was fixed at one end and exhibited flexure, any drift due to the flexure of the mandrel from the fixed end during the production cycle tended to adversely affect the concentricity or symmetry of the product being formed.

We have found that the foregoing difficulties can be minimized by providing an improved method and apparatus for assuring the desired cross-sectional symmetry or concentricity in the hollow product as well as facilitate its production on a continuous basis.

OBJECTS OF THE INVENTION

It is thus the object of the invention to provide an improved method and apparatus for producing long lengths of hollow tubing having an annular wall of foamed material, e.g. plastic.

Another object is to provide a method whereby hollow cylindrical tubing can be produced from foam plastic having a desired concentricity.

A further object is to provide a method for producing hollow tubing over a mandrel wherein the flexural alignment of the mandrel is controlled during the process so as to control as far as possible the cross-sectional symmetry or concentricity of the hollow tubing.

Another object is to provide an apparatus and a method with means provided to enable flexible laminar material wrapped around the mandrel of being drawn freely along the mandrel during a tube-making process.

A still another object of the invention is to provide an apparatus and method for producing hollow tubing from foam plastic in which means are provided for detecting variations in alignment of the mandrel during processing and for correcting the alignment depending upon the amount of variation detected.

These and other objects will clearly appear from the following disclosure and the accompanying drawings wherein:

FIG. 1A is illustrative of a camming device for allowing the molds to negotiate the sprocket driving the mold chains;

FIG. 1B shows a cradle assembly for use in guiding the feed of foaming plastic between the inner and outer covering of the conduit being formed;

Figure 1:
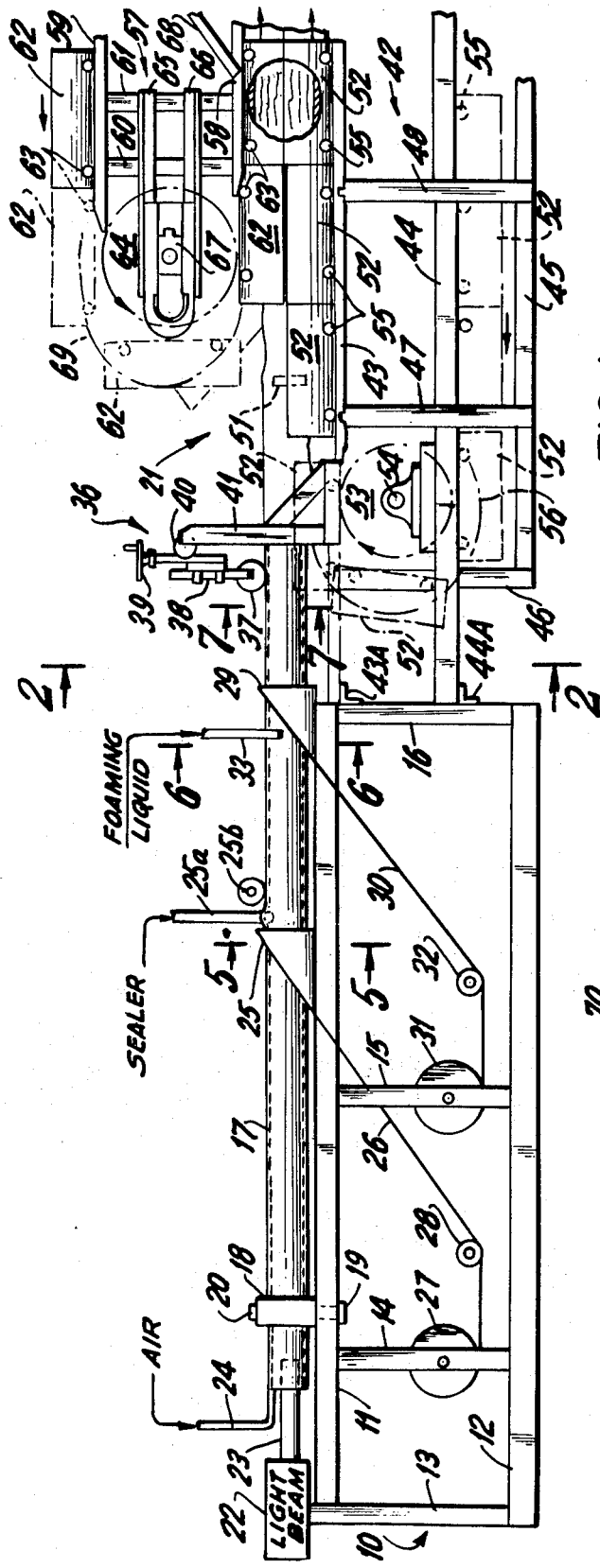
FIG. 1 is illustrative of the feed end section of one embodiment of the apparatus provided by the invention.
Figure 5:
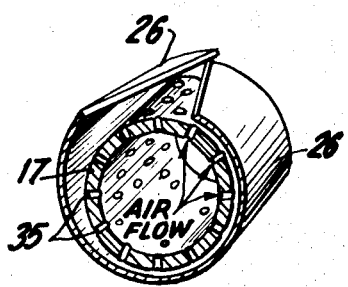
Figure 6:
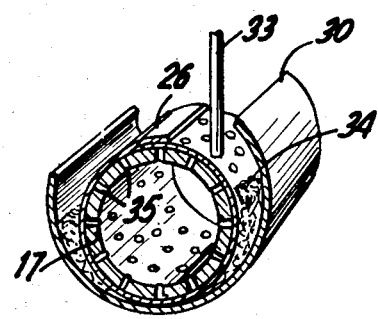
Figure 7:
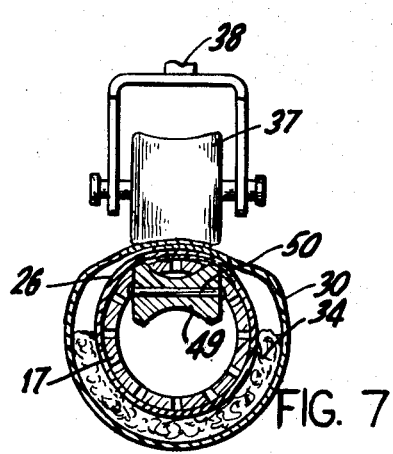
Figure 8:
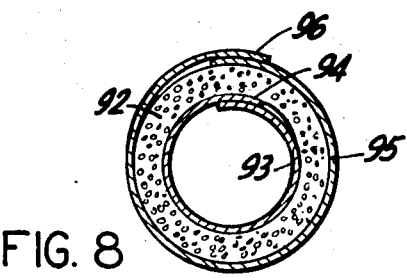
Figure 9:
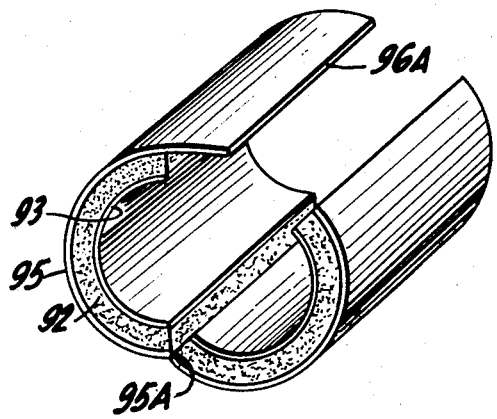
Figure 10:
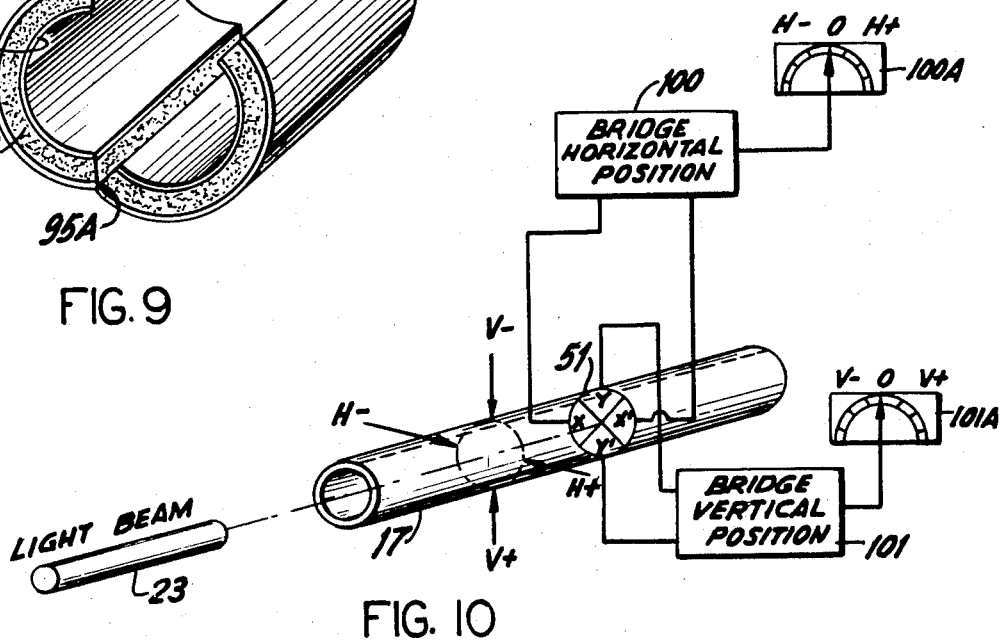
Figure 11:
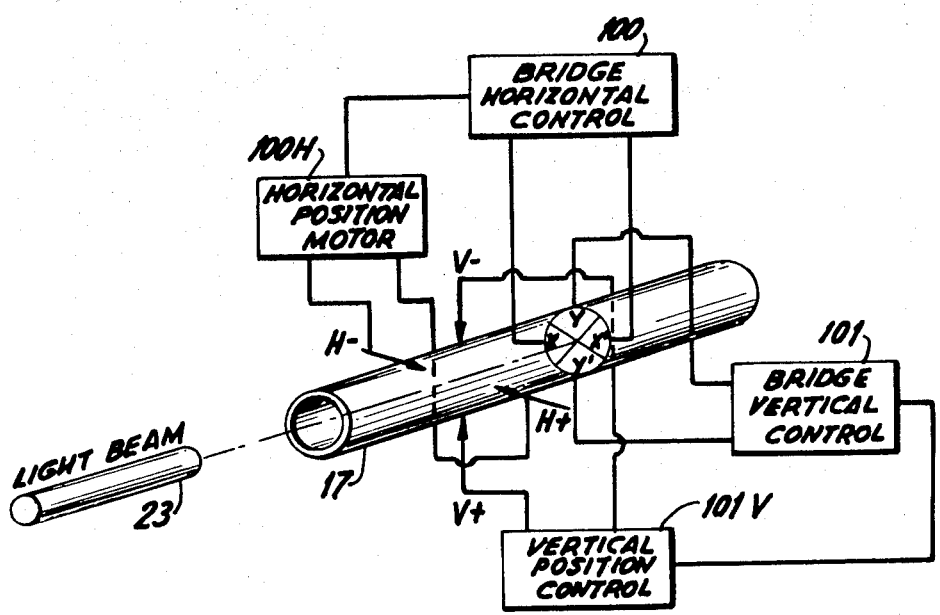
Figure 12:
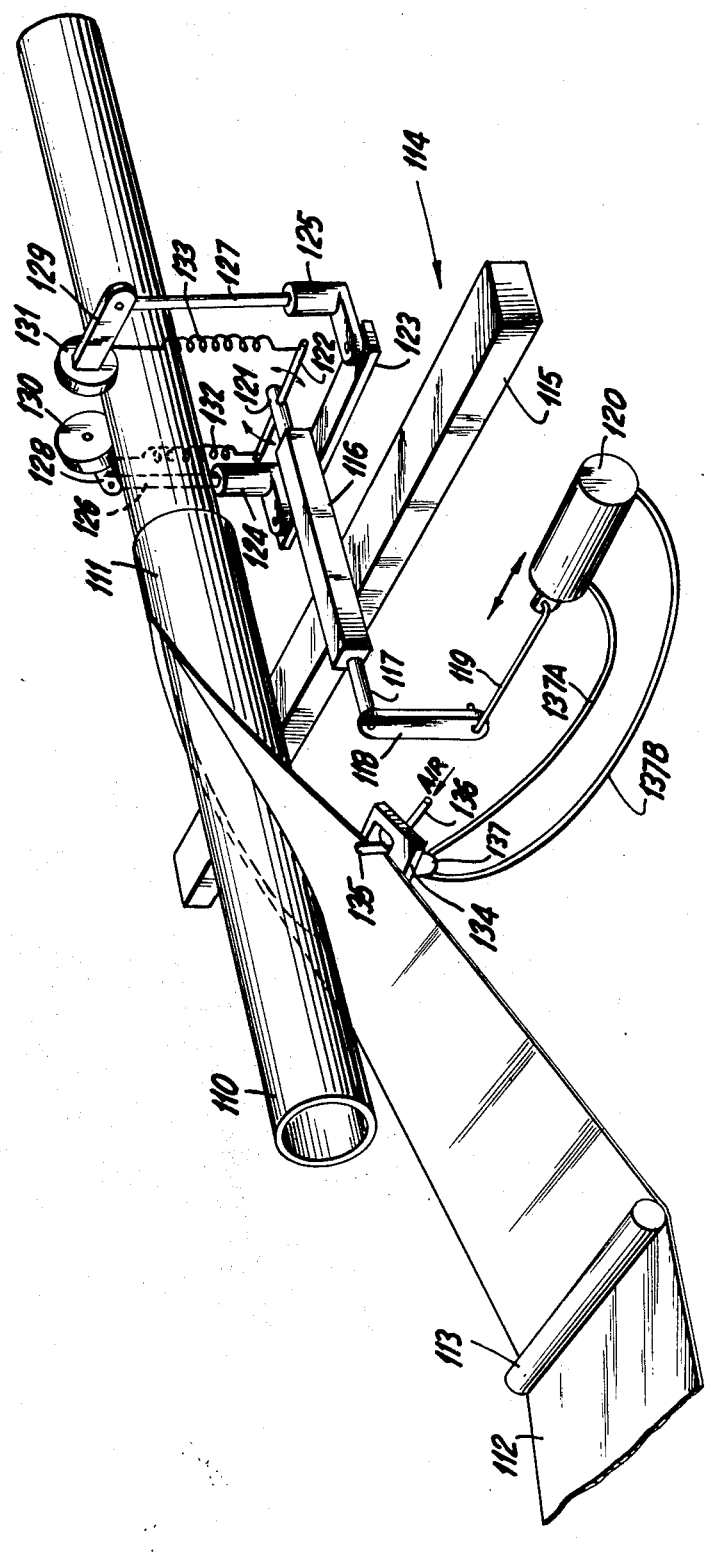
Figure 13:
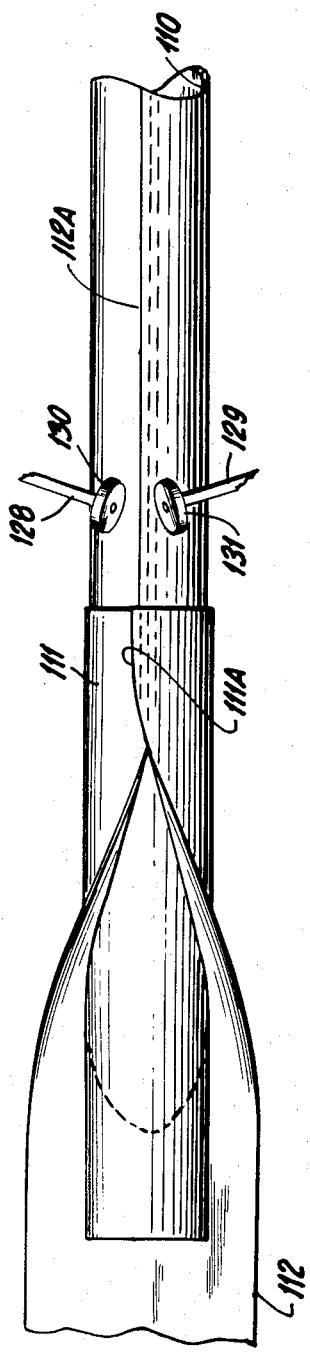
Figure 14:
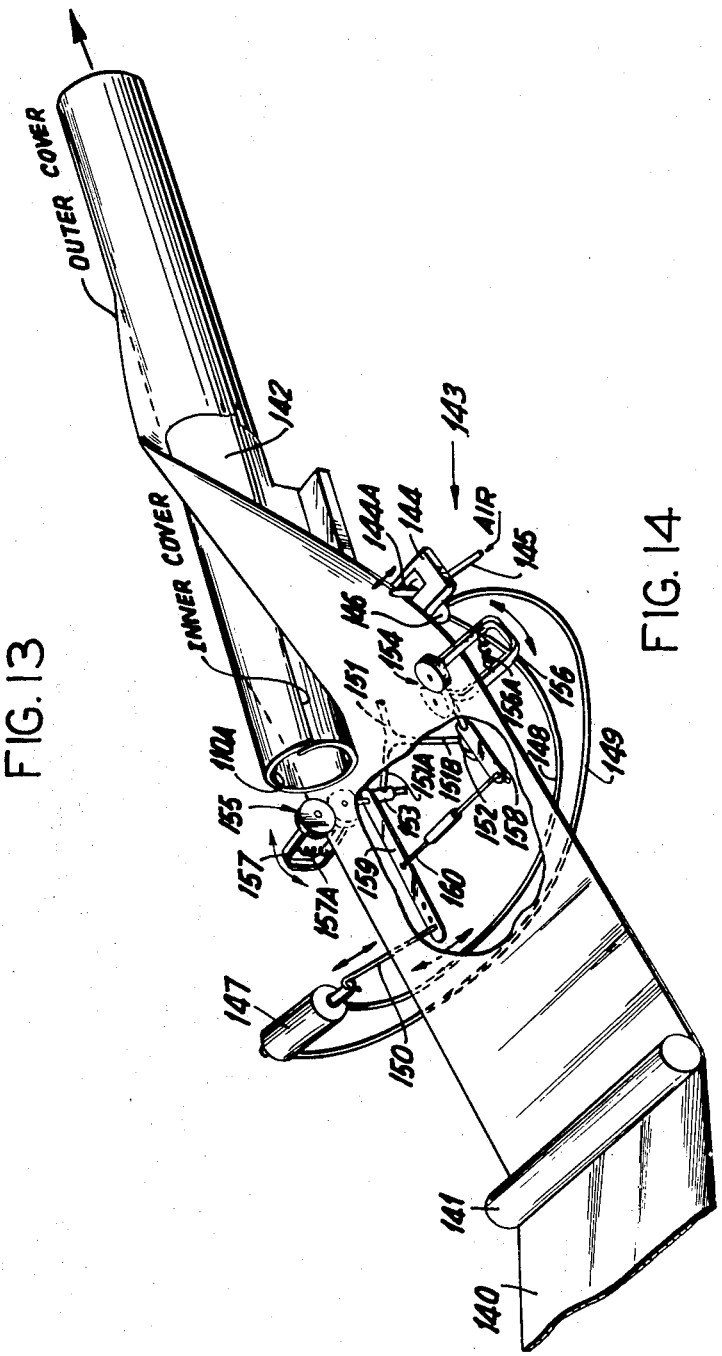

FIGS. 5, 6, and 7 are transverse views taken along lines 5—5, 6—6, and 7—7 of FIG. 1, FIGS. 5 and 6 being shown in three dimensions for clarity;

FIG. 8 is a cross-section of a completed tubing produced in accordance with the invention;

FIG. 9 is a fragment of a foam plastic tubing produced in accordance with the invention, the fragment being longitudinally severed in half to provide a hinged construction to enable the tubing to be employed as an insulation around a pipe;

FIGS. 10 and 11 illustrate various embodiments for detecting and controlling variations in the flexure of the mandrel employed in making foam tubing; and FIGS. 12 to 14 are preferred embodiments of devices that may be employed to guide and assure the desired position of the envelope of flexible material while it is being formed as a tubular covering around the mandrel.

As in U.S. Pat. No. 3,113,800, in producing the hollow tubing, we start with a surface retaining means, such as a mandrel, corresponding to the inner surface of the hollow tubing and then perform all of the necessary steps about the surface retaining means. A continuous strip of flexible laminar material, such as paper, foil, plastic, or other suitable material, is drawn from a coil longitudinally of the mandrel and wrapped around it to form an inner cover while moving the laminar material longitudinally of the mandrel. Then, an envelope of similar resilient or flexible laminar material is drawn from another coil and wrapped as a loose envelope or sheathing about the previously wrapped mandrel to form an outer cover to provide an annular space therebetween into which metered amounts of foaming plastic or elastomeric material are poured and allowed to expand against the cover of the supporting surface of the mandrel and the outer envelope, while the laminar materials are drawn along the mandrel. The mandrel is made sufficiently long so that during the initial part of the process, the foaming plastic or elastomeric material expands and fills up the annular space between the inner and outer cover surrounding the mandrel and polymerizes to a hardness sufficient to enable the hollow tube to be removed from the mandrel. The invention resides in an improvement of the foregoing process.

BRIEF SUMMARY OF THE INVENTION

Stating it broadly, one aspect of the invention resides in means for aligning the mandrel to compensate for any drifting during the process by controlling the flexure thereof to a position which will provide a hollow tubing having the desired cross-sectional symmetry or concentricity depending upon whether the tubing is cylindrical or prismatic in shape. The mandrel, which is hollow, has means associated with a region thereof away from the fixed end of the mandrel for detecting any variation of flexure of the mandrel during the manufacture of the hollow tubing, the variation being compensated for by actuating the alignment means of the mandrel.

A preferred embodiment comprises alignment means for aligning said mandrel to a position to provide a hollow tubing of desired symmetry or concentricity, means associated with the mandrel opposite its fixed end for detecting any variations in the alignment of the mandrel and means responsive to the detecting means for actuating the alignment means, whereby to maintain the mandrel in the desired position.

The method aspect of the invention resides in aligning the mandrel by controlling its flexure from the fixed end thereof, continuously detecting variations in the alignment during the production of the hollow tubing and then adjusting the alignment of the mandrel away from its fixed end in accordance with the amount of variation detected.

In carrying out the various aspects of the invention, it is particularly preferred that the hollow mandrel have small perforations therein to allow for egress of air from within the mandrel under slight pressure, e.g. 5 lbs. per square inch, to allow for an air cushion or air lubrication beneath the inner covering of the mandrel to aid in moving the tubular product along the mandrel during its manufacture in withdrawing it from the mandrel. The detail aspects of the invention will be apparent from the following description.

DETAILS OF THE INVENTION

Referring to FIG. 1, the feed end section of the apparatus is shown comprising a steel framework 10 formed of top and bottom horizontal members 11 and 12 and vertical members 13 to 16. Anchored to the top of the frame is a hollow mandrel 17, e.g. of aluminum, the mandrel being anchored via a collar 18 bolted to frame member 11 at 19 and having a locking member 20, e.g. a set screw, to effect clamping of the mandrel in the collar. As will be noted, the mandrel extends substantially horizontally along the top of the frame to and through the molding section designated generally by the numeral 21.

At the far left end of the frame, a laser or other collimated light beam device 22 is supported on member 13; with its collimator 23 extending into the open end of the hollow mandrel which is sealed to assure buildup of the desired back pressure, the free end of the mandrel being similarly sealed. Also extending into the mandrel is an air tube 24 for directing a flow of warm air under slight pressure to be described later.

Forward of the fixed end of the mandrel is a funnel-shaped or tapered collar 25 open at the top through which collar is drawn a strip of flexible laminar material 26 of paper, foil, plastic, and the like, from coil 27 over idle roller 28, the funnel-shaped collar being adapted to gradually form the strip of material as an inner cover snugly about the mandrel as shown in FIG. 5 when viewed in the direction of the arrows 5—5 of FIG. 1. A sealer assembly comprising a heating element 25a with its end inserted in an opening of the mandrel, and a roller 25b is provided. A hot melt adhesive in the form of a continuous strip is fed between overlapping portions of the flexible material being wrapped about the mandrel, the overlapped portion then passing between roller 25b and the heater to effect the bonding thereof.

Forward of collar 25 is another funnel-shaped or tapered collar 29, similarly open at the top, through which collar is drawn a strip of another flexible or resilient laminar material 30 from coil 31 over idle roller 32, the collar being adapted to gradually form or wrap the strip loosely as an outer cover or envelope surrounding the inner cover, while providing an annular space between the inner and outer covers. While the strip material 30 is drawn through collar 29, a liquid of foaming material, e.g. plastic or rubber, is continuously metered and fed via pipe or hose 33 onto said strip 30 from a blending system controlled by an instrument board (not shown). This is illustrated more clearly by referring to FIG. 6 which shows foaming liquid 34 filling up the annular space between outer cover of strip material 30 and inner cover of strip material 26 which is shown lapped over and snugly wrapped around mandrel 17. The mandrel shown in FIGS. 5 and 6 depicts perforations or orifices 35 in the wall of the mandrel, through which air flows under pressure to provide fluid lubrication between inner cover 26 and the mandrel so that the inner cover will move or slide more easily along the mandrel as the finished tube is withdrawn therefrom in a manner to be described later. As will be appreciated, roller guides may be provided to ride on top of the mandrel so that as the inner and outer covering material is wrapped or enveloped about it, the roller guides guide and help to maintain the inner and outer cover in the desired relative position until they enter the molds, the molds being configurated to provide a cavity corresponding to the outer surface of the tubing being made. Embodiments of guide devices for the envelope material are shown in FIGS. 12 to 14 to be described later.

An assembly which may be employed in assuring deposition of the foaming plastic between the inner and outer covering being applied about the mandrel is shown in FIG. 1B. Two cradles are provided, a lower cradle 105 underneath the mandrel already covered with the inner wrapping and an inverted upper cradle 106 adjacent the upper half of the mandrel in opposing and overlapping contact with the lower cradle. The cradles are supported by means not shown. Thus, the cradles together in effect surround the mandrel except for the portions that do not overlap. The outer covering 107 of the conduit is brought up and partially around the upper cradle as shown to surround the mandrel similarly as laminar material 30 of FIG. 1, except that an opening 108 is provided through the top of cradle 107 through which a pipe or hose 33A passes for delivering foaming plastic between the inner and outer wrapping or covering of the conduit to be formed. This assembly is a preferred embodiment.

The mandrel extends to and through the mold-carrying section of the apparatus designated generally by the numeral 21 and is supported by the molds until the mandrel is surrounded by the hollow foam plastic tubing, in which case the tubing passing through the molds serves as a support, even though the tubing is being continuously drawn off the mandrel. Forward of collar 29, one embodiment of an alignment device designated generally by the numeral 36 is provided for adjusting the alignment of the mandrel comprising a grooved wheel 37 mounted on a spindle 38 which is capable of displacement via an actuating wheel crank 39, the spindle being capable of moving horizontally transversely to the longitudinal axis of the mandrel via a wheel crank 40, the alignment device being supported by superstructure 41 which, in turn, is supported on a part of lower conveyor frame 42 comprising horizontal members 43 to 45 and vertical members 46 to 48, etc. Horizontal members 43 and 44 extend to the left and are coupled to vertical member 16 of the mandrel support frame via angles 43A and 44A.

The mandrel adjacent grooved wheel 37 of the alignment device has an opening in its upper surface in which is rotatably supported a roller having an endwise taper at both ends thereof as shown in FIG. 7 as viewed along line 7—7 of FIG. 1. For convenience, only the mandrel is shown in conjunction with the alignment device, it being understood that when the apparatus is in operation, wheel 37 is adjusted when the mandrel is enveloped within the strip material. As shown in FIG. 7, the double tapered roller 49 is shown rotatably mounted via a pin 50 which extends into the mandrel wall. As the inner strip material enveloping the mandrel is drawn longitudinally along the mandrel, it passes freely between grooved wheel 37 and rotatable mandrel roller 49. The outer covering 30 is shown loosely surrounding the mandrel with foaming plastic 34 therein. Since the groove of wheel 37 coincides substantially with the end tapers of roller 49, the amount of flexure of the mandrel can be controlled either vertically by turning crank wheel 39 which is coupled by a worm or rack gear (not shown) to spindle 38 (FIG. 1), or controlled horizontally by turning crank wheel 40 (FIG. 1) which is similarly coupled to the spindle. Looking at FIG. 7 in which grooved wheel 37 is substantially meshed with tapered roller 49, any slight horizontal movement of the wheel to the left or right will cause the mandrel to move or flex slightly to the left or right. Likewise, any slight movement of wheel 37 vertically will cause slight flexing of the mandrel in the vertical plane.

When a collimated beam of light or a laser beam is used in determining the alignment of the mandrel, a detector 51 (e.g. photoelectric cell) may be employed located beyond the alignment adjustment device substantially centrally within the hollow mandrel as the mandrel enters the molding section of the apparatus. However, the position of the detector may be along any part of the mandrel forward of the fixed end of the mandrel subject to flexure so long as it is before the molding section. The manner by which photoelectric cell or detector 51 cooperates with the collimated light beam in determining variations in alignment will be described later.

Figure 2:
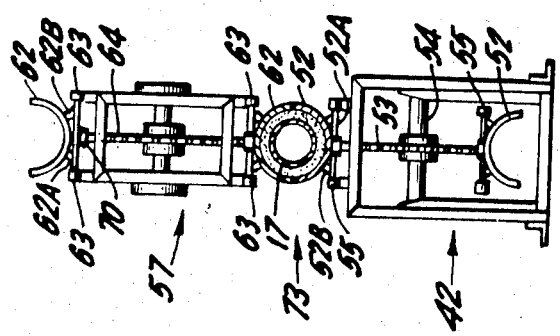
FIG. 2 is a side view in elevation of the apparatus section of FIG. 1 as viewed in the direction of arrows 2—2 for the purpose of showing the relationship between the upper and lower conveyors to which are attached mating mold halves which molds then cooperate to form a complete mold surrounding the mandrel.

Proceeding now to the beginning of the mold section of the apparatus, a chain conveyor is provided riding on lower conveyor frame 42 carrying a plurality of pivotally connected mold halves 52 shown in transverse section in FIG. 2, the chain conveyor riding between horizontal members 43 of the frame. The chain is coupled to sprocket 53 (FIG. 1) mounted on shaft 54, the sprocket moving in the direction of the arrows, and driven from the discharge end of the apparatus, the mold halves having wheels 55 which ride along horizontal members 43. As the mold halves negotiate their way around the sprocket, a camming surface (note FIG. 1A) is provided to guide the molds into molding position so as not to strike the strip material being formed along the mandrel. The camming surface is designed so that the mold halves describe the path shown by dotted line 56. This is achieved as shown in FIG. 1A by having the bottom of each mold pivotally connected at 52A at its center to the conveyor chain, such that each mold half is capable of rocking about the pivot connection as it negotiates the sprocket and contacts the cam 52B which is located partially circumferentially about the sprocket wheel. The front wheels are adapted to ride the cam as shown (the rear wheels being adapted to clear the cam) so that the mold half rocks about pivot 52A and is brought gently into position around the mandrel without striking the mandrel and the material around it as it negotiates the sprocket.

The upper mold conveyor frame is designated generally by the numeral 57 and comprises horizontal members 58, 59 connected to vertical members 60,61. Member 59 has a track upon which the pivotally mounted mold halves ride via wheels 63, the molds being chain driven in the direction of the arrow (to the left), the chain meshing with sprocket 64 which is mounted via cross members 65 and 66, the sprocket being mounted on a slidable fixture 67 adjustable to provide the desired chain tension. The upper conveyor has struts, e.g. 68, and continues through a curing oven together with the lower conveyor to the discharge section shown in FIG. 3 to be described later. As in the lower conveyor section, the mold halves 62 negotiate the sprocket wheel and are cammed (using a camming surface similar to 52B of FIG. 1A) so that the molds describe the path shown by dotted line 69, the purpose being to position carefully the mold relative to the covered mandrel without striking the material surrounding the mandrel.

As the mold halves negotiate the turn of the sprocket wheel, they mate respectively with corresponding lower mold halves 52 to define in this case a cylindrical cavity whose diametric dimensions correspond substantially to the outer diameter of the hollow tube being produced. That is to say, as the foaming liquid expands within the envelope of strip material surrounding the inner cover of the mandrel, it fills out to the limit of the mold diameter. This will be more clearly apparent by referring to FIG. 2 which is an end view in elevation taken along line 2—2 of FIG. 1.

Referring to FIG. 2, upper conveyor frame 57 is shown directly above lower conveyor frame 42. The upper conveyor is shown comprising mold support 62A against which mold 62 is pivotally supported via legs 62B, the mold support having a chain link 70 as one of a series along the chain which meshes with sprocket 64. The mold is designed as a half cylinder and has wheels 63 at the side of the mold support which ride on tracks as shown at the top and bottom of the upper conveyor frame.

Similarly, the corresponding mold half 52 is associated with lower conveyor frame 42, the mold having a support 52A to which it is connected via legs 52B, the mold support also having wheels 55 which ride on conveyor tracks as shown. The mold support has a chain link 72 as one of a series along the chain which meshes with sprocket 53.

The upper and lower mold halves mate in between the upper and lower conveyors at the region designated generally in FIG. 2 by the numeral 73, the mating molds surrounding mandrel 17 substantially concentrically. As will be noted, an annular space is provided between the mandrel and the mating molds into which the envelope of foaming plastic expands and fills up the space.

Figure 4A:
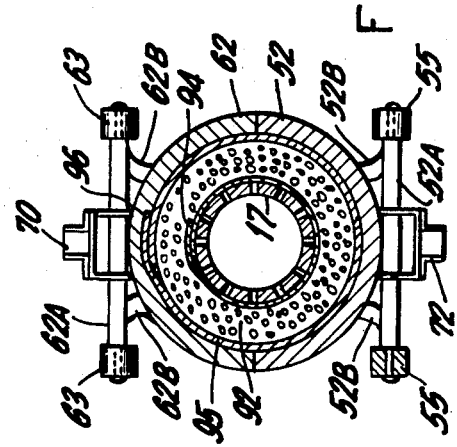
FIG. 4A is a cross section of the molded product in the curing oven as taken along line 4A—4A of FIG. 4.
Figure 3:
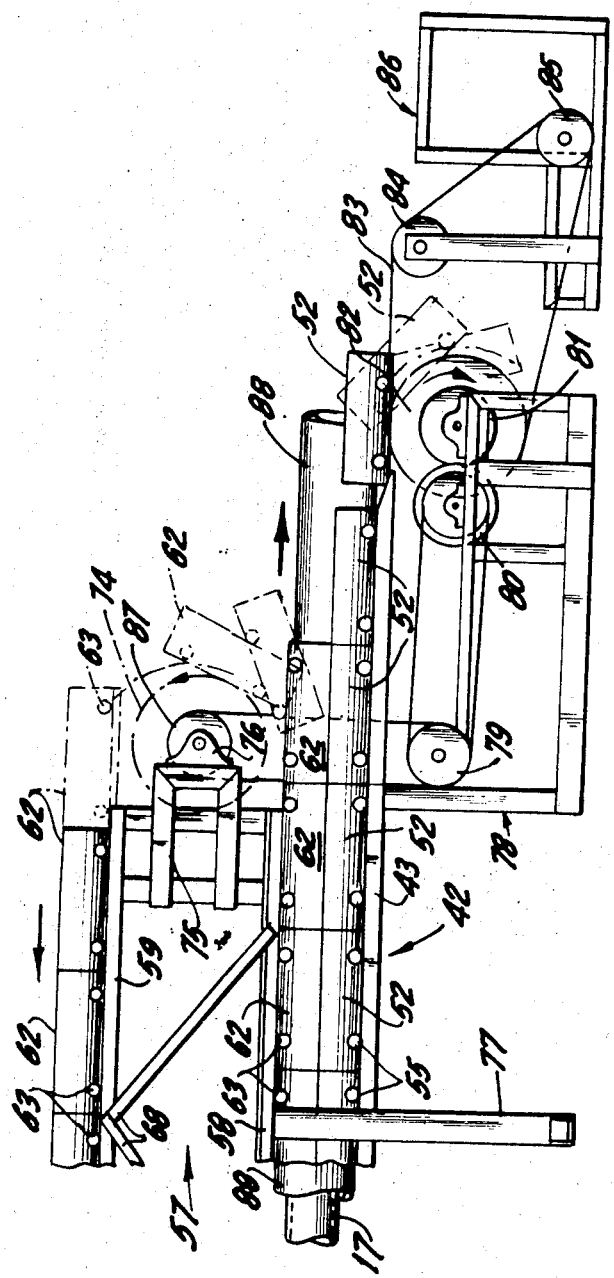
FIG. 3 is illustrative of the discharge end section of the apparatus of FIG. 1.
Figure 4:
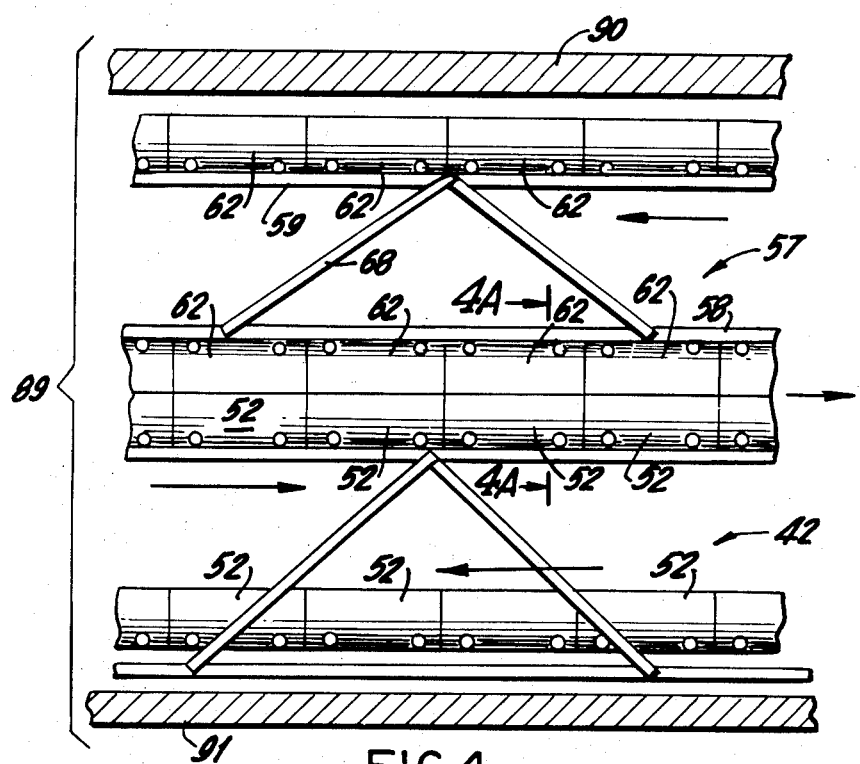
FIG. 4 is an enlarged portion of the intermediate section of the apparatus showing the mold conveyors passing through a heating closure or oven in which the foam plastic products are cured.

The discharge section of the apparatus is depicted in FIG. 3, the section being a continuation of the upper and lower conveyor frames after passing through a curing oven, the central portion of the apparatus where curing is achieved being shown in FIG. 4.

As in FIG. 1, the discharge end of the upper conveyor has a sprocket 74 mounted on sprocket frame 75 via pillow block 76, the conveyor chain with mold halves passing around the sprocket in its return travel to the feed end of the apparatus along top frame member 59. The conveyor frame 42 is supported by leg 77 and framework 78, the framework having a set of sprocket drives 79 and 80 driven by sprocket 81 coaxial with converyor sprocket 82 which is driven by chain 83 and sprockets 84, 85, sprocket 85 being driven by a motor (not shown) supported by the framework. Sprocket 79 is chain-connected to sprocket 87 coaxially mounted with upper conveyor sprocket 74, thus transmitting power to the conveyor sprocket which is synchronously driven along with lower conveyor sprocket 82 so that mating mold halves 52 and 62 are moved along the mandrel at the same speed. As with the feed end of the apparatus, the molds negotiate sprockets 74 and 82, respectively, in the same manner, that is, the mold halves are pivotally cammed away as in FIG. 1A from the hollow foam plastic tubing being drawn off of the mandrel, thereby avoiding striking of the tubing being discharged from the apparatus.

A fragment of mandrel 17 is shown extending rearward of assembled mold halves 52 and 62, a fragment of the hollow foam plastic tubing 88 also being shown extending longitudinally from the molds.

FIG. 4 is the oven portion surrounding the mandrel located between the feed-end and discharge-end sections of the apparatus. However, a curing oven need not be employed where the formulation of the foam elastomeric material is such that the material, after completion of foaming, cures or polymerizes at room temperature (such as by using a catalyst) within the time that the foaming mixture is deposited with the envelope of laminar material and the time it reaches the discharge end of the machine. Thus, reference to a curing oven hereinabove is not essential to the practicing of the invention, but is merely included by way of illustration as one embodiment by which curing or polymerization is achieved.

FIG. 4, which is enlarged for purposes of clarity, shows upper and lower conveyor frame portions 42 and 57 depicting movement of the mold halves in the directions indicated by the arrows through the oven designated generally bu numeral 89, the oven having top and bottom walls 90 and 91. The oven may be heated by warm air circulated by means not shown. A typical curing temperature may range from about 100° to 130° F.

As mold halves 52 and 62 pass through the center part of the oven in mating relationship to the right of FIG. 4, the molds being made of metal, such as aluminum, and having good heat conductivity heat up fairly rapidly. By this time, the foaming liquid or mixture has expanded in the envelope of laminar material to within the complete space defined by the two mold halves. Thus, as the foamed material polymerizes, it becomes rigid and is capable of being uniformly gripped by the mold halves and drawn along the surface of the mandrel, this being easily accomplished since air flowing through the mandrel and out through the perforations or orifices in the wall of the mandrel provide air lubrication at the mandrel surface.

The extent to which the hollow tubular product has been formed is illustrated by FIG. 4A which is a section taken along line 4A—4A of FIG. 4. As will be observed from FIG. 4A, the two mold halves 52 and 56 are shown in opposed abutting relationship and define a cylindrical cavity surrounding the mandrel 17 which in turn is covered by the hollow product designated by the numeral 92. Upper mold half 62 is shown supported by its base 62A via legs 62B, the base having a link 70 serving as part of the chain driving the mold, wheels 63 being provided at opposite ends of the base. Lower mold half 52 similarly has a base 52A supporting it via legs 52B, wheels 55 being also provided at opposite ends thereof. The base likewise has a chain link 72 as one of many links making up the chain.

The hollow tubular product confined within the mold has an inner wall or covering 93 of paper, foil, plastic strip, or the like, lap sealed at 94. The sealing may be achieved by hot melt sealing well known in the art, or simply heat sealed, or sealed using conventional adhesives. The lap seal may be mechanically applied, etc. Similarly, the hollow tubular product 92 has an outer wall or covering 95 of paper, foil, plastic, or the like, which is lap sealed at 96. The space between the inner and outer walls 93 and 95 of the tubular product is filled with the expanded, polymerized elastomeric material. The final tubular product is shown by way of the cross section depicted in FIG. 8, the product being identified by the same numerals, a fragment of the product in perspective being also illustrated in FIG. 9.

As stated hereinbefore, in producing a hollow tubular product, care must be exercised to assure some measure of symmetry or concentricity of the final product. One embodiment is shown in FIG. 1 in which a light beam (e.g. a coherent beam, such as a laser) is employed to aid in determining any variation in the alignment of mandrel 17, a detecting device, such as a photoelectric cell, being employed to detect such variations. Thus, when a variation in alignment is detected, the alignment is corrected by means of an alignment device 36 which is adapted to reposition the mandrel slightly in either the horizontal or vertical plane by means of wheel cranks 39 or 40.

FIG. 10 illustrates schematically one embodiment by which the foregoing may be done. A collimator 23 is shown for directing a light beam, e.g. a laser beam, longitudinally into hollow mandrel 17 which has mounted within it a photoelectric cell 51 disposed in the path of the beam. The mandrel is fixed at its feed end as shown in FIG. 1. One example of a laser device is an autoreflecting tooling laser manufactured by Perkin-Elmer Corporation of Norwalk, Connecticut, referred to as the Model 5650 Auto Reflecting Laser. This device is capable of linear alignment of 10 microinches per foot of displacement between the laser and the centering detector device (photoelectric cell). For the purposes of the invention, this degree of accuracy is not necessary. For example, in producing a hollow tubular product having a ½-inch wall of foamed elastomeric material, the wall thickness is acceptable having a tolerance of about ± 1/16 inch.

The power input to this laser is 115 V ± 10 V, 0.7 amp. and 50–60 Hz. The detector is comprised of a quadrature array (note detector 51 of FIG. 10) with opposing detectors wired in a bridge circuit for sensing. The differential signal generated by a pair of cells when in an out-of-line position is amplified and fed to the appropriate indicator meter or other device. Thus, referring to FIG. 10, opposite quadrants X—X' and Y—Y' of the detector are coupled to bridge circuits 100 (horizontal position) and 101 (vertical position), respectively. Bridge 100 is coupled in turn to meter 100A and bridge 101 to meter 101A. Means for flexing the mandrel is indicated schematically by arrows H— and H+ (for horizontal displacement) and arrows V— and V+ (for vertical displacement) which may represent the horizontal and vertical displacement device 36 shown in FIG. 1.

Assuming that the alignment has been set at a reference zero setting as shown by meters 100A and 101A, and that the product being manufactured has the desired concentricity, and assuming that for some reason the mandrel has started to drift vertically in the V+ direction so as to adversely affect the desired concentricity of the hollow product being produced, a V+ reading is immediately indicated on meter 101A. When this occurs, an operator manipulates wheel crank 39 (FIG. 1) to correct the variation and bring the reading on the meter back to zero. Had meter 100A indicated a horizontal displacement, then wheel crank 40 would be manipulated to bring the reading back to zero.

As will be appreciated, the method described hereinabove may be automated by utilizing reversible motors to actuate wheel cranks 39 and 40 depicted in alignment device of FIG. 1. This is shown schematically in FIG. 11 which is similar to FIG. 10 except for the addition of horizontal position motor 100H and vertical position motor 101V. Assuming that the mandrel has displaced horizontally during the manufacturing cycle, a difference signal generated by cells X—X' is determined by bridge horizontal control 100 and the signal amplified and fed to horizontal position motor 100H which operates, for example, wheel crank 40 in the direction corresponding to the sign of the signal, the motor being reversibly operable. The motor continues to rotate until the correct alignment has been achieved and the signal decreased to zero and the motor stopped, thus indicating correction of the alignment.

As illustrative of the invention, the following example is given.

A flow of warm air is injected into the hollow end of the mandrel (note FIG. 1) by means of air pipe 24, the air being fed at a pressure of about 5 lbs/square inch to assure some flow of air through orifices 35 (note FIGS. 5 and 6) in the wall of the mandrel to provide air lubrication beneath the laminar material to be wrapped around the mandrel. One method of proceeding with the operation of the apparatus with reference to FIG. 1 is to draw excess flexible wrapping material from coil 27 to start the wrapping cycle of the inner covering around the mandrel via tapered collar 25. At the same time, flexible wrapping material is drawn from coil 31 to provide the loose outer covering spaced from the mandrel, excess outer covering being inserted in the molds to provide sufficient frictional drag to pull the material along the mandrel when the mold conveyor is turned on. As the inner and outer wrappings are caused to move along the mandrel, foaming plastic liquid is fed through pipe 33 between the inner and outer covering. As the plastic begins to expand within the confines of the outer covering, it fills up the annulus and applies pressure to the mandrel and begins to cause it to flex during centering. The mandrel is pushed up against centering wheel 37 and during the initial part of the process, eccentric tubing is produced which is discarded.

Once the production cycle has reached a steady state following correction for concentricity, the annular cylindrical product on the mandrel in its cured state helps to maintain the correct alignment. However, it is expected that slight changes in alignment will occur and which can be compensated for by utilizing the alignment correcting techniques described herein. The automatic method of maintaining concentricity shown in FIG. 11 is particularly advantageous in this regard.

In feeding the wrap-around strip of flexible material onto and around the mandrel, it has been found advantageous to employ automatically operable guiding means to prevent the strip from drifting transversely about the mandrel. As shown in FIG. 1, the inner and outer wrap-around strip is caused to be wrapped about the mandrel by strip formers 25 and 29, respectively. However, transverse drifting of the strip can occur which can result in a kind of twisting of the strip about the mandrel. This can be avoided by using the feeding guide devices of FIGS. 12 to 14.

Referring to FIG. 12, a segment of the hollow mandrel 110 is shown passing through forming collar 111 supported by means not shown (note collar 25 of FIG. 1). The strip 112 is drawn from a coil not shown against idle roller 113, the strip being then brought up underneath the mandrel through forming collar 111 which forms and wraps the strip about the mandrel. Located beneath the mandrel is a guide assembly referred to generally by the numeral 114 comprising a cross member 115 upon which is supported a hollow bar 116 through which a rotatable rockshaft 117 passes, the shaft at its rearward end having a rocker arm 118 integral therewith with the free end of the rocker arm connected by a hooked member 119 to a reciprocating pneumatic cylinder 120 to be described later.

The forward or free end 121 of the rockshaft has a pin 122 passing transversely through it. Fixed transversely beneath the end of bar 116 is a cross member 123 at opposite ends on which are mounted L-shaped supports 124, 125, one leg of each support being mounted by suitable fastening means to the cross member, the other leg of each supporting a spindle 126 and 127, each of the spindles rising up on opposite sides of the mandrel, the mandrel passing between the spindles. Pivotally mounted transversely to the free end of spindle 126 and spindle 127 are rocker arms 128 and 129, respectively, the end of each rocker arm having a rotatable wheel 130 and 131, respectively. The periphery of each wheel is biased against the surface of the mandrel by means of springs 132 and 133, each being fastened under tension to the opposite ends of pin 122 on rockshaft 117.

Coupled pneumatically to the guide assembly is a strip feeler element 134 in the form of a flat member arranged transversely to stip 112 and serving as a supporting surface to the strip as it is drawn over it towards former 111. The feeler element is slotted and has a pressure finger 135 extending upwardly from the slot against which the edge of the strip bears by biasing action of the finger. The finger is pivotally coupled to feed air tube 136 for pneumatic cylinder 120 via a conventional two-way valve 131 (coupled via lines 137A and 137B to cylinder 120) such that if strip 112 tends to drift to the right (to the right of the drawing) reaction means must be set in motion to resist this rightward drift. This is achieved by causing the piston of pneumatic cylinder 120 to move to the right which then causes rockshaft 117 to rotate to the left, causing increased tension on spring 132, whereby wheel 130 (which is preferably made of rubber or other elastomeric material) is caused to increase frictional contact with the strip on the left side of the mandrel to develop a force couple on the wrap-around strip to resist the drift to the right. If the tendency is to cause a drift to the left, then the piston is caused to move to the left and provide a rotation to the right of rockshaft 117 and increased pressure of wheel 131 on the right side of the mandrel.

It will be noted from FIG. 13 which is a top view of the device of FIG. 12 that former 111 is configurated to provide a slight overlap at 111A, the upper overlap being spaced from the portion below it. This design aids in providing the desired overlap of strip 112 at 112A shown in FIG. 13 by means of which sealing of the inner covering is achieved by employing a hot melt adhesive or other type of sealant.

Referring now to FIG. 14, another device is shown for controlling the feed of the outer wrapping or covering forming the outer wall of the conduit. The strip 140 is drawn from a coil (not shown) against an idle roller 141 to former 142 which is designed similarly to collar 111 of FIGS. 12 and 13 to form the outer covering about mandrel 110A with an overlap to provide tongue 96A shown in FIG. 9 of the product produced by the apparatus. The device for guiding and controlling the transverse drift of the outer covering is designated generally by the numeral 143.

As in the device of FIGS. 12 and 13, a slotted flat member 144 is provided having a pressure finger 144A extending upwardly therefrom which is biased against the edge of strip 140 which is drawn over the flat member to strip former 142, the flat member being arranged transversely of the strip. The finger is pivotally coupled to air feed tube 145 via a conventional two-way valve 146, the valve being coupled to reciprocating pneumatic cylinder 147 via air lines 148 and 149. The piston of the air cylinder is connected via hooked element 150 to a group of linkages which actuate device 143 according to the drift to be corrected.

The device comprises a yoke 151 which may be coupled to the surface supporting strip former 142, the yoke having two legs 151A and 151B each of which is coupled to a vertical spindle 152 and 153, each of which acts as a rockshaft and support a pair of friction wheels 154 and 155, respectively, each pair of friction wheels being mounted in peripheral contact with each other as shown, the pairs being mounted astride the width of the strip, with the strip passing between the peripherally abutting wheels.

The wheels of each pair are mounted on the free ends of the legs of a flexible U-shaped member 156 and 157, the legs being biased towards each other by means of springs 156A and 157A.

The spindles 152 and 153 are connected by linkages 158, 159 and 160, linkages 158; 159 being substantially parallel to each other and coupled by cross linkage 160, linkage element 159 being longer than linkage element 158, the free end of which is coupled to hooked member 150 which in turn is coupled to the piston of air cylinder 147.

If the strip tends to drift to the right by pressure of its edge against finger 144A, the two-way valve is actuated to cause the piston of cylinder 147 to move to the lower right of the drawing, which movement through the linkage system causes the opposite pair of wheels to provide a slight counterclockwise movement about the supporting yoke such that the drift to the right is resisted and, in effect, compensated for by a slightly deliberate drift to the left. If the drift to the left is too much, the piston of cylinder 147 is caused to move to the left as shown in the drawing, with the net result that the wheel assembly is given a slight clockwise rotation to resist the leftward drift transversely of the mandrel.

As will be apparent, the foregoing embodiments of FIGS. 12 to 14 provide a device for guiding the strip during the forming of the strip about the mandrel, whether to form the inner wall or the outer wall of the conduit, the device comprising means for sensing the drift of the strip transverse to the direction of the mandrel, means in contact with the strip for applying a transverse force to the strip in a direction opposite to the drift, and means coupled to the force applying means and operable by said sensing means for actuating the force applying means when the sensing means senses said drift.

The final product may be severed longitudinally to provide a product as shown in FIG. 9 having a hinged wrap-around construction in which the unsevered part of the outer cover of strip material provides a hinge 95A as well as an extending tongue portion 96A for lap bonding the two halves of tubing together by means of a suitable adhesive. An advantage of hollow tubing made in accordance with the invention is that it is practically strain free so that when it is longitudinally severed as in FIG. 9, it is capable of mating accurately together when it is wrapped as an insulation around a pipe. Heretofore, pipe insulation made by cutting a section or bun of foam plastic into longitudinal half-sections of tubing tended to warp out of shape because of strains in the section due to non-uniform curing rates in the large section or bun from which the half-sections are cut. Thus, the halves did not always mate together adequately. However, this is not the case with the tubing of the invention as the curing is substantially uniform throughout the cross section of the tube. Also, the halves of the tubing naturally mate with each other since their cut faces are common to each other.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In an apparatus for continuously forming hollow tubing of cured foam plastic material comprising a mandrel fixed at one end about which said tubing is formed by confining said foam material within an annular space of an envelope of flexible laminar material formed around said mandrel and allowing said foam material to expand, the envelope of confined foamed material being then moved longitudinally thereof and thereafter cured while moving along said mandrel, the improvement which comprises, means for aligning said mandrel by controlling its flexure to a position to provide a product having the desired concentricity, and means associated with a region of said mandrel away from the fixed end for detecting variations in alignment from the desired alignment, whereby when a variation in alignment is detected, the means for aligning said mandrel is actuated to compensate for said variation.

2. In an apparatus for continuously forming hollow tubing of cured foam plastic material comprising a mandrel fixed at one end about which said tubing is formed by confining said foam material within an annular space of an envelope of flexible laminar material formed around said mandrel and allowing said foam material to expand, the envelope of confined foamed material being then moved longitudinally thereof and thereafter cured while moving along said mandrel, the improvement which comprises, wherein the mandrel is hollow and has air orifices in the surface thereof, means for feeding air into the hollow of said mandrel, means for aligning said mandrel by controlling its flexure to a position to provide a product having the desired concentricity, and means associated with a region of said mandrel away from the fixed end for detecting variations in alignment from the desired alignment, whereby when a variation in alignment is detected, the means for aligning said mandrel is actuated to compensate for said variation.

3. In an apparatus for continuously forming hollow tubing of cured foam plastic material comprising a mandrel fixed at one end about which said tubing is formed by confining said foam material within an annular space of an envelope of flexible laminar material formed around said mandrel and allowing said foam material to expand, the envelope of confined foamed material being then moved longitudinally thereof and thereafter cured while moving along said mandrel, the improvement which comprises, wherein the mandrel is hollow and has air orifices in the surface thereof, means for feeding air into the hollow of said mandrel, means for feeding and for forming a first strip of flexible material into a tubular covering around said mandrel, means for feeding and for forming a second strip of flexible material into an envelope spaced from but completely surrounding said supported tubular covering and provide an annular space therebetween, means for inserting a curable foaming plastic mixture into said annular space, conforming mold means for supporting said envelope containing the foaming mixture within said annular space until the mixture has expanded and filled up the mold, means for aligning said mandrel by controlling its flexure to a position to provide a product having the desired concentricity, and means associated with a region of said mandrel away from the fixed end for detecting variations in alignment from the desired alignment, whereby when a variation in alignment is detected, the means for aligning said mandrel is actuated to compensate for said variation and provide a desirable product.

4. The apparatus of claim 3, including guide means for inhibiting transverse drifting of at least one of said strips being fed to said mandrel, said guide means comprising means for sensing the drift of said strip transverse to said mandrel, means in force-applying relation to said strip for applying a transverse force to the strip in a direction opposite to the drift, and means coupled to the force-applying means and operable by said sensing means for actuating the force applying means when the sensing means senses the drift of said strip.

5. The apparatus of claim 4, wherein said guide means is provided for guiding each of said first strip and said second strip.

6. In an apparatus for continuously forming hollow tubing of cured foam plastic material comprising a mandrel fixed at one end about which said tubing is formed while confined within an annular space of an envelope of flexible laminar material formed around said mandrel and the confined foamed material then moved longitudinally of said mandrel and thereafter cured while moving along said mandrel, the improvement which comprises, alignment means for aligning said mandrel to a position corresponding to a desired concentricity, means cooperably associated with said mandrel for detecting variations in said alignment, and means responsive to said detecting means for actuating said alignment means whereby to maintain said mandrel in a position corresponding to the desired concentricity of said tubing.

7. In an apparatus for continuously forming hollow tubing of cured foam plastic material comprising a mandrel fixed at one end about which said tubing is formed while confined within an annular space of an envelope of flexible laminar material formed around said mandrel and the confined foamed material then moved longitudinally of said mandrel and thereafter cured while moving along said mandrel, the improvement which comprises, wherein the mandrel is hollow and has air orifices in the surface thereof, means for feeding air into the hollow of said mandrel, alignment means for aligning said mandrel to a position corresponding to a desired concentricity, means associated with said mandrel for detecting variations in said alignment, and means responsive to said detecting means for actuating said alignment means whereby to maintain said mandrel in a position corresponding to the desired concentricity of said tubing.

8. In an apparatus for continuously forming hollow tubing of cured foam plastic material comprising a mandrel fixed at one end about which said tubing is formed while confined within an annular space of an envelope of flexible laminar material formed around said mandrel and the confined foamed material then moved longitudinally of said mandrel and thereafter cured while moving along said mandrel, the improvement which comprises, wherein the mandrel is hollow and has air orifices in the surface thereof, means for feeding air into the hollow of said mandrel, means for forming a first strip of flexible material into a tubular covering around said mandrel, means for forming a second strip of flexible material into an envelope spaced from but completely surrounding said supported tubular covering and provide an annular space therebetween, means for inserting a curable foaming plastic mixture into said annular space, conforming mold means moveable along said mandrel for supporting said envelope containing the molding mixture within said annular space until the mixture has expanded and filled up the mold, alignment means for aligning said mandrel to a position corresponding to a desired concentricity, means associated with said mandrel for detecting variations in said alignment, and means responsive to said detecting means for actuating said alignment means whereby to maintain said mandrel in a position corresponding to the desired concentricity of said tubing.

9. The apparatus of claim 8, including guide means for inhibiting transverse drifting of at least one of said strips being fed to said mandrel, said guide means comprising means for sensing the drift of said strip transverse to said mandrel, means in force-applying relation to said strip for applying a transverse force to the strip in a direction opposite to the drift, and means coupled to the force-applying means and operable by said sensing means for actuating the force-applying means when the sensing means senses the drift of said strip.

10. The apparatus of claim 9, wherein said guide means is provided for guiding each of said first strip and said second strip.

11. In an apparatus for producing elongated articles of cured foam material whose outer surface is formed of an envelope of flexible material which comprises, means for feeding a strip of flexible material along a longitudinal axis to an envelope-forming station, strip guide means located along said longitudinal axis for controlling the transverse drifting of said strip fed to said envelope-forming station, including means for sensing the drift of said strip transverse to said axis, means in force-applying relation to said strip for controlling the transverse drift thereof, including means operable by said sensing means for actuating said force-applying means when transverse drifting of said strip is sensed, means for feeding a foaming mixture of curable material onto said strip, means at said envelope-forming station for forming said strip into an envelope about said longitudinal axis, thereby confining said foaming mixture within said envelope, and mold means following said forming station for confining said envelope of foaming material, the cross-sectional contour of said mold means corresponding to a desired peripheral contour of said elongated article and against which the foaming material expands.

12. The apparatus of claim 11, wherein the mold means comprise movable upper and lower mold conveyors, each conveyor carrying a series of mold halves which mate with corresponding mold halves of the other, such that moving mating mold halves are adapted to confine said envelope of foaming material and move it along said longitudinal axis.

13. The apparatus of claim 12, including means for curing said envelope of foaming material while confined within said molds.

* * * * *